United States Patent [19]

Arzenti et al.

[11] Patent Number: 4,771,526
[45] Date of Patent: Sep. 20, 1988

[54] SLEEVING OF STEAM GENERATORS

[75] Inventors: Thomas E. Arzenti, Munhall; William E. Pirl, Penn Township, Westmoreland County, both of Pa.

[73] Assignee: Westinghouse Electric Corp., Pittsburgh, Pa.

[21] Appl. No.: 785,291

[22] Filed: Oct. 7, 1985

[51] Int. Cl.⁴ .................. B21D 53/00; B23P 19/04
[52] U.S. Cl. .................. 29/157.4; 29/157.3 R; 29/252; 29/254; 29/726; 29/906; 376/271; 254/29 R
[58] Field of Search ............... 29/157.4, 157.3 R, 720, 29/721, 723, 726, 244, 254, 234, 252, 282, 400 N; 376/271, 264, 262, 261, 260, 228, 249; 254/106, 29 R

[56]  References Cited

U.S. PATENT DOCUMENTS

| | | |
|---|---|---|
| 3,052,494 | 9/1962 | Williamson . |
| 3,118,555 | 1/1964 | Bent et al. . |
| 3,574,386 | 4/1971 | Frost . |
| 3,714,770 | 2/1973 | Rothke . |
| 3,791,011 | 2/1974 | Keys . |
| 3,805,359 | 4/1974 | Webb . |
| 3,857,158 | 12/1974 | Costello . |
| 3,892,437 | 7/1975 | Makinen . |
| 3,915,311 | 10/1975 | Ball et al. . |
| 3,936,089 | 2/1976 | Hoffmeister ............... 376/262 |
| 3,950,020 | 4/1976 | Hoffmeister ............... 376/262 |
| 4,005,896 | 2/1977 | Ball et al. . |
| 4,104,790 | 8/1978 | Hindrichs . |
| 4,125,928 | 11/1978 | Cowley et al. . |
| 4,173,368 | 11/1979 | Haverbusch . |
| 4,236,967 | 12/1980 | Batjukov et al. ............ 376/271 |
| 4,277,052 | 7/1981 | Kallinger .................. 254/106 |
| 4,347,652 | 9/1982 | Cooper, Jr. et al. . |
| 4,406,856 | 9/1983 | Wilkins et al. . |
| 4,410,210 | 10/1983 | deSivry et al. . |
| 4,479,547 | 10/1984 | Boyadjieff et al. .......... 254/29 R |
| 4,586,250 | 5/1986 | Cooper, Jr. et al. .......... 29/723 |

Primary Examiner—Howard N. Goldberg
Assistant Examiner—Irene Graves Golabi

[57]  ABSTRACT

A tool for inserting sleeve blanks in damaged steam-generator tubes of light weight capable of being manipulated by ROSA, a remotely operated service arm. ROSA permits the tool to be attached externally of the channel head of the steam generator.

The tool includes a fixed gripper and a moveable gripper. The gripping member of each gripper is a flexible sheet or bladder which conforms readily to the surface being engaged. For insertion, the sleeve blank is mounted on a mandrel. The insertion is carried out by operating the grippers repeatedly through the following cycle until the sleeve blank is inserted into the damaged tube:

(a) The moveable gripper is set in the lowermost position.
(b) The fixed gripper is open.
(c) The moveable gripper engages the sleeving assembly.
(d) The moveable gripper raises the sleeving assembly to the uppermost position.
(e) The sleeving assembly is engaged by the fixed gripper.
(f) The moveable gripper is disengaged from the sleeving assembly.
(g) The moveable gripper is returned to the lowermost position to start a succeeding cycle.

For positioning, the tool includes a closed-circuit TV unit for centering the tool with reference to a tube other than the damaged tube and another closed-circuit TV unit for monitoring the insertion of the sleeve blank.

11 Claims, 15 Drawing Sheets

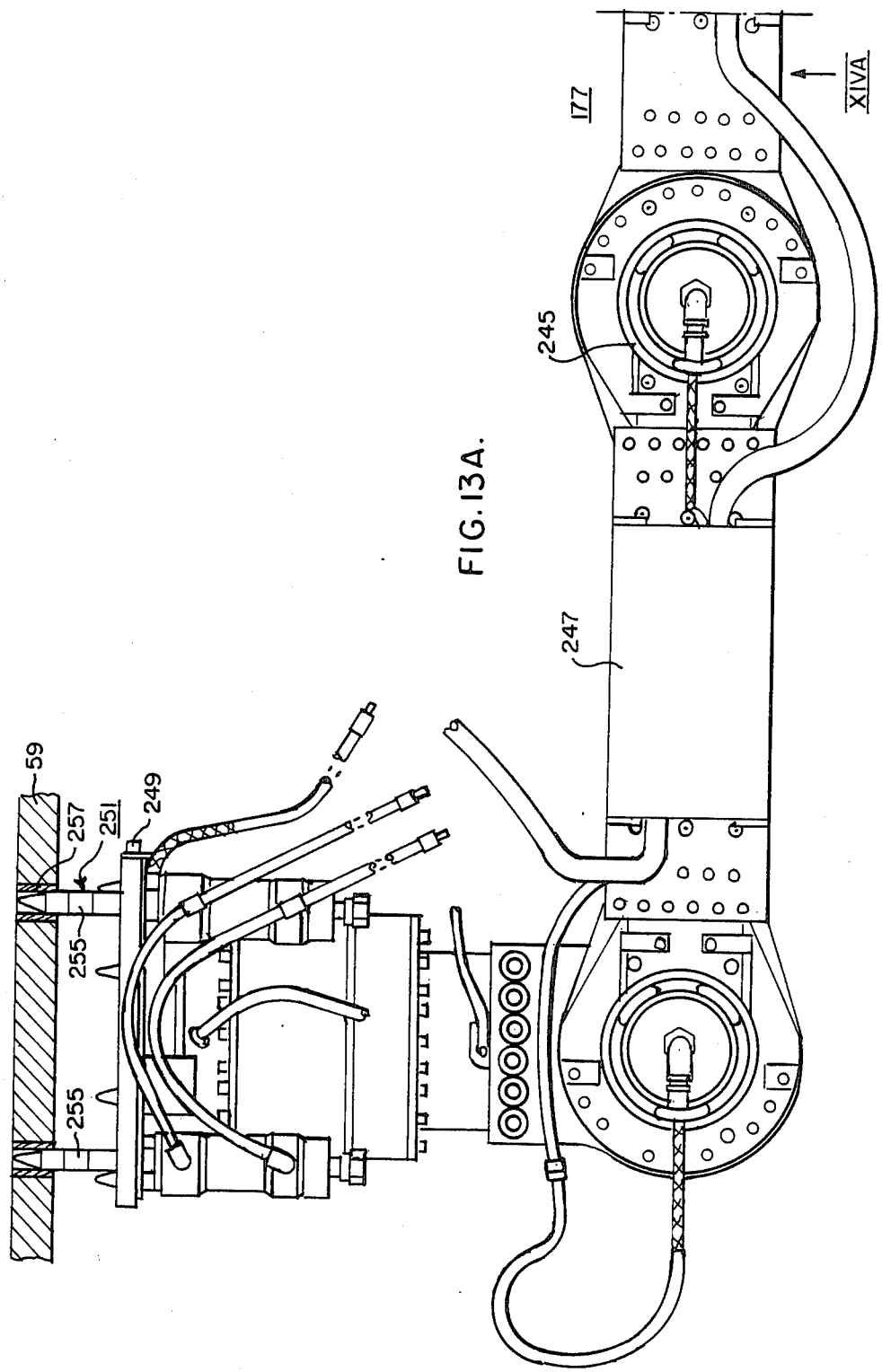

SLEEVING OF STEAM GENERATORS

CROSS-REFERENCE TO RELATED APPLICATION

Application Ser. No. 785,292 filed concurrently herewith to Thomas E. Arzenti and William E. Pirl for Gripper Assembly and assigned to Westinghouse Electric Corporation is incorporated in this application by reference.

BACKGROUND OF THE INVENTION

This invention relates to nuclear reactors and has particular relationship to the sleeving of damaged or corroded tubes of a steam generator of a nuclear reactor. Damaged tubes are sleeved by inserting sleeve blanks into the tubes. For insertion, a sleeve blank is mounted on a mandrel. The sleeve blank and mandrel is referred to herein as a "sleeving assembly".

The tubes of a steam generator are sealed through a tube sheet from the bottom of which a channel head extends. Damaged tubes are accessible for sleeving from within the channel head. The channel head may be entered through a manway. The region within the channel head is radioactive and it is desired to minimize the exposure of personnel to radioactivity within the channel head during a sleeving operation.

U.S. Pat. No. 4,463,994 granted Feb. 3, 1987 to Frank W. Cooper et al. for Suspension of Tools for Sleeving of Tubes of Steam Generator (herein Cooper) and assigned to Westinghouse Electric Corporation is typical of the prior art. Cooper has performed highly satisfactorily. However, its operation demands that personnel be exposed to radioactivity for short intervals within the channel head. There is an additional drawback to Cooper. The channel head is a semi-sphere so that as the periphery of the tube sheet is approached, the channel head avails less and less vertical space for a sleeve-blank insertion operation. The Cooper sleeve-blank insertion apparatus vertical space is of such length that the area of the tube sheet over which it can sleeve damaged tubes is restricted.

There has become available a robotic manipulator tool which is referred to as Remote Operated Service Arm or ROSA. In the process of creating this invention, it has been realized that ROSA can be loaded with sleeving apparatus or a sleeving tool externally of the channel head and may then be controlled, from a control station outside of the channel head, so that it moves the tool into the channel head and positions the tool for a sleeving operation. The insertion into the channel head and sleeving operation of the tool may then be controlled from a station external to the channel head. By external control of the tool, the mandrel may then be withdrawn preparatory to another sleeving operation.

A ROSA has a plurality of arms between which actuators for moving the arms in different directions are interposed. A typical actuator is disclosed in U.S. Pat. No. 4,398,110, Flinchbaugh et al. (herein Flinchbaugh). A ROSA of practicable dimensions and structurer can manipulate a load of limited weight, typically about 50 pounds. A greater weight might result in deformation of its arms and damage to motors, brakes, tachometers, resolvers, or other parts of the actuators. A disadvantage of the Cooper apparatus and other prior-art apparatus is that its weight exceeds the weight which can be handled by a ROSA.

It is an object of this invention to overcome the drawbacks and disadvantages of the prior art and to provide apparatus for a tool for inserting a sleeve blank into a damaged tube of a steam generator of a nuclear reactor, or into a tube of any other like tubular apparatus, which tool shall be capable of being manipulated by a ROSA of reasonable weight, dimensions and structure. Specifically, it is an object of this invention to provide sleeve-blank insertion apparatus having a total weight of less than 50 pounds. Another object of this invention is to provide a sleeve-insertion apparatus which shall be capable of inserting sleeve blanks into tubes of a steam generator which are located over a greater area of the tube sheet than is within the capability of prior-art sleeve-blank insertion apparatus.

It is also an object of this invention to provide a method for inserting a sleeve blank into a damaged tube of a steam generator in whose practices the disadvantages of the prior art shall be eliminated.

SUMMARY OF THE INVENTION

This invention arises from the realization that both the high weight of the prior art apparatus and the limitation of the area of the tube sheet over which it can insert sleeve blanks results from the drive of this apparatus. It has been realized the weight of sleeve-insertion apparatus can be reduced in such a way that the area of the tube sheet over which a sleeve blank can be inserted is substantially increased. Typically in Cooper the drive for the sleeving assembly is a hydraulic motor which drives a lead screw. The lead screw, in turn, drives a bracket which carries the sleeving assembly. The hydraulic motor, lead screw and bracket contribute materially to the weight of the sleeving apparatus. The length of the lead screw and hydraulic motor limit the area of the tube sheet through which sleeve blanks may be inserted into damaged tubes.

In accordance with this invention, both the hydraulic motor and the lead screw are dispensed with. The weight of the sleeving apparatus is thus materially reduced. The sleeving assembly is advanced by a gripper which is driven by a fluid cylinder, typically an air cylinder. The gripper engages the sleeving assembly to advance the assembly intermediate its ends. The vertical space necessary for insertion of a sleeving assembly, including a sleeve blank and a mandrel, is governed only by the length of the sleeving assembly that is to be inserted. The mandrel is usually longer than the sleeve blank. The area of tube sheet over which sleeve blanks may be inserted is thus materially greater than the corresponding area for prior art apparatus.

There is provided in accordance with this invention apparatus or a tool for inserting a sleeve blank into a damaged tube of a steam generator. The tool includes a fixed gripper and a moveable gripper and a fluid cylinder for driving the moveable gripper. A sleeving assembly is formed by mounting the sleeve blank on a mandrel. The bladders of the grippers are inflated by air pressure to grasp the sleeving assembly. The apparatus is secured under the tube sheet positioned so that the sleeving assembly is thrust into the damaged tube by upward movement. The sleeving assembly is advanced into the tube step-by-step as the moveable gripper, in its lowermost position, repeatedly engages the sleeving assembly and moves it upwardly and then is disengaged from the sleeving assembly and returned to its lowermost position. Between upward strokes of the moveable gripper, the sleeving assembly is held in its latest position by the fixed gripper until it is engaged to be moved another step by the moveable gripper. At the end of each upward movement step, the fixed gripper engages the sleeving assembly before the fixed gripper is disengaged.

When the sleeve blank is fully inserted and expanded in the damaged tube as a sleeve, the mandrel is removed by the reverse movement of the movable gripper while being held between steps by the fixed gripper. The surface of the mandrel varies in contour along its length but the bladders, which constitute the holding members of the grippers, readily conform to this changing surface.

In the absence of personnel in the channel head, the positioning of the sleeving apparatus and of the sleeving assembly is monitored by two closed-circuit TV units. The camera of each unit is mounted on the base from which the grippers and the cylinder which drives the grippers are mounted. Preparatory to an insertion operation, the sleeving apparatus is positioned so that the optical axis of one camera is coaxial with a tube near the damaged tube which is to be sleeved. The optical system of the other camera is set at an angle so that the insertion of the sleeve blank into the damaged tube may be monitored. Plunger assemblies including plungers which extend upwardly from the base aid in the levellling of the base and the apparatus suspended from it.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 4 is a fragmental view partly in section taken in the direction IV of FIG. 1 and showing particularly the camera of the TV unit which monitors the insertion of a sleeve blank;

FIG. 5 is a fragmental view in longitudinal section along line V—V of FIG. 1 showing the light assembly which illuminates the areas viewed by the TV cameras;

FIGS. 13A and 13B together constitute a plan view of a typical ROSA used in the practice of this invention;

DETAILED DESCRIPTION OF THE INVENTION

Figure 20:
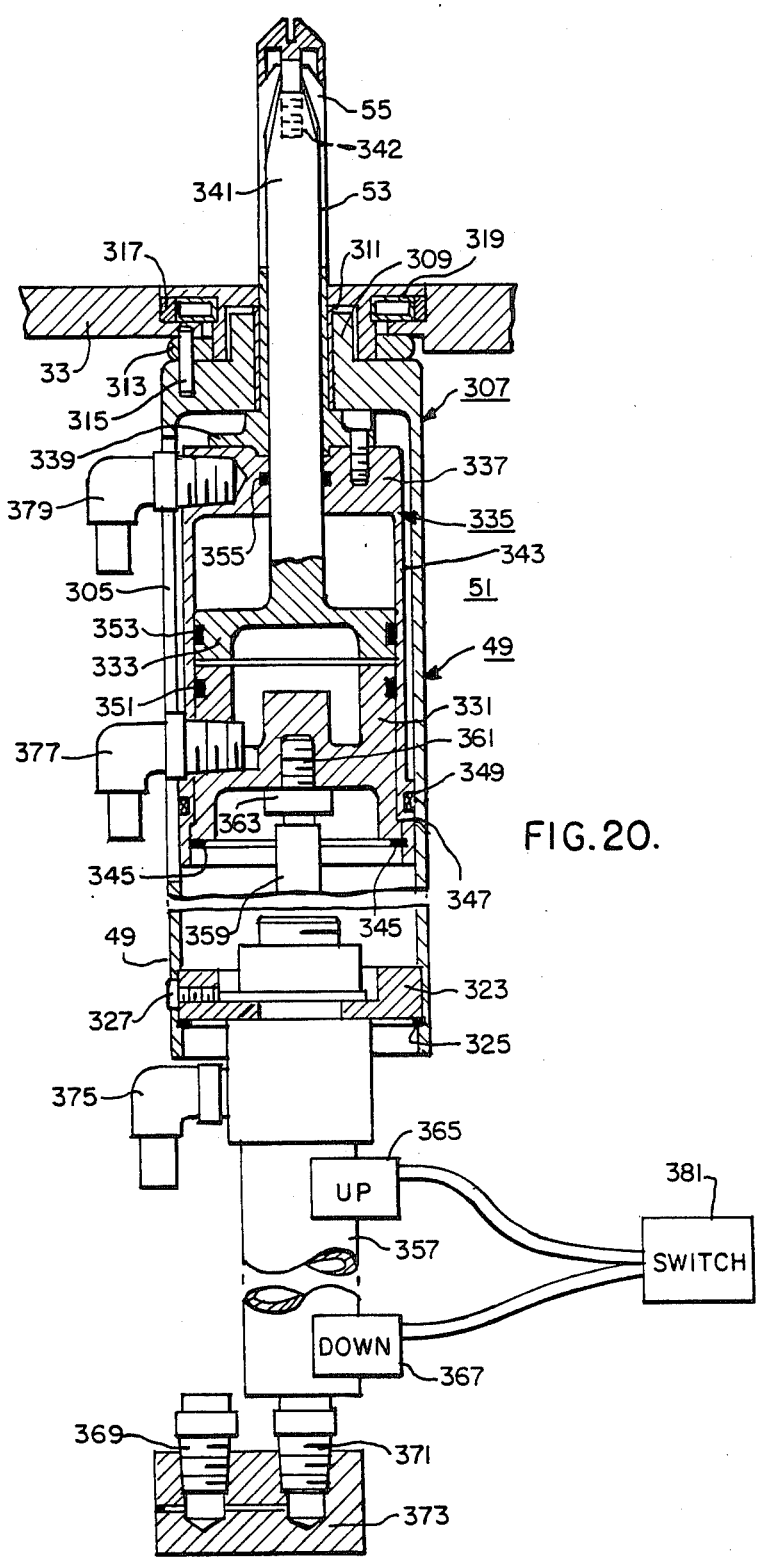
FIG. 20 is a view predominantly in longitudinal section of the camlock assembly for suspending the sleeving apparatus according to this invention from a tube sheet of a steam generator including a tube to be sleeved.

The sleeve-blank insertion apparatus 31 and some of its components are shown predominantly in FIGS. 1 through 12. This apparatus includes a base plate or top plate 33 (FIGS. 1-6), a bottom plate 35 and a back plate 37 secured between the top and bottom plates. The base plate 33 is of generally trapezoidal shape but with the longer side tapered and rounded beyond the tapers. The back plate 37 is of U-transverse cross-section (FIG. 1) and is bolted to the base plate 33 symmetrically with respect to its center line 39 through the parallel sides which divide the base plate into like halves. A ROSA adapter 41 is suspended cantilever fashion from the back plate 37 just below the base plate 33. The ROSA adapter 41 includes a plate 43 to whose lower or inner surface a connector 45 (FIGS. 3, 15, 16) for connecting the sleeve-blank inserter 31 to the ROSA is provided. The plate 43 is braced by beams 47. The cylinders 49 of camlock assemblies 51 extend inwardly from the rounded corners near the longer side of the base plate 33. The camlock assemblies 51 are each centered about an opening in the base plate 33 through which the rods 53 carrying the camlock collet 55 (FIG. 20) can be projected upwardly into tubes 57 in the tube sheet 59 (FIG. 2) which are near the damaged tube 61 being sleeved. The camlock assemblies serve to secure the sleeving apparatus to the tube sheet in position to carry out a sleeving operation.

Figure 1:
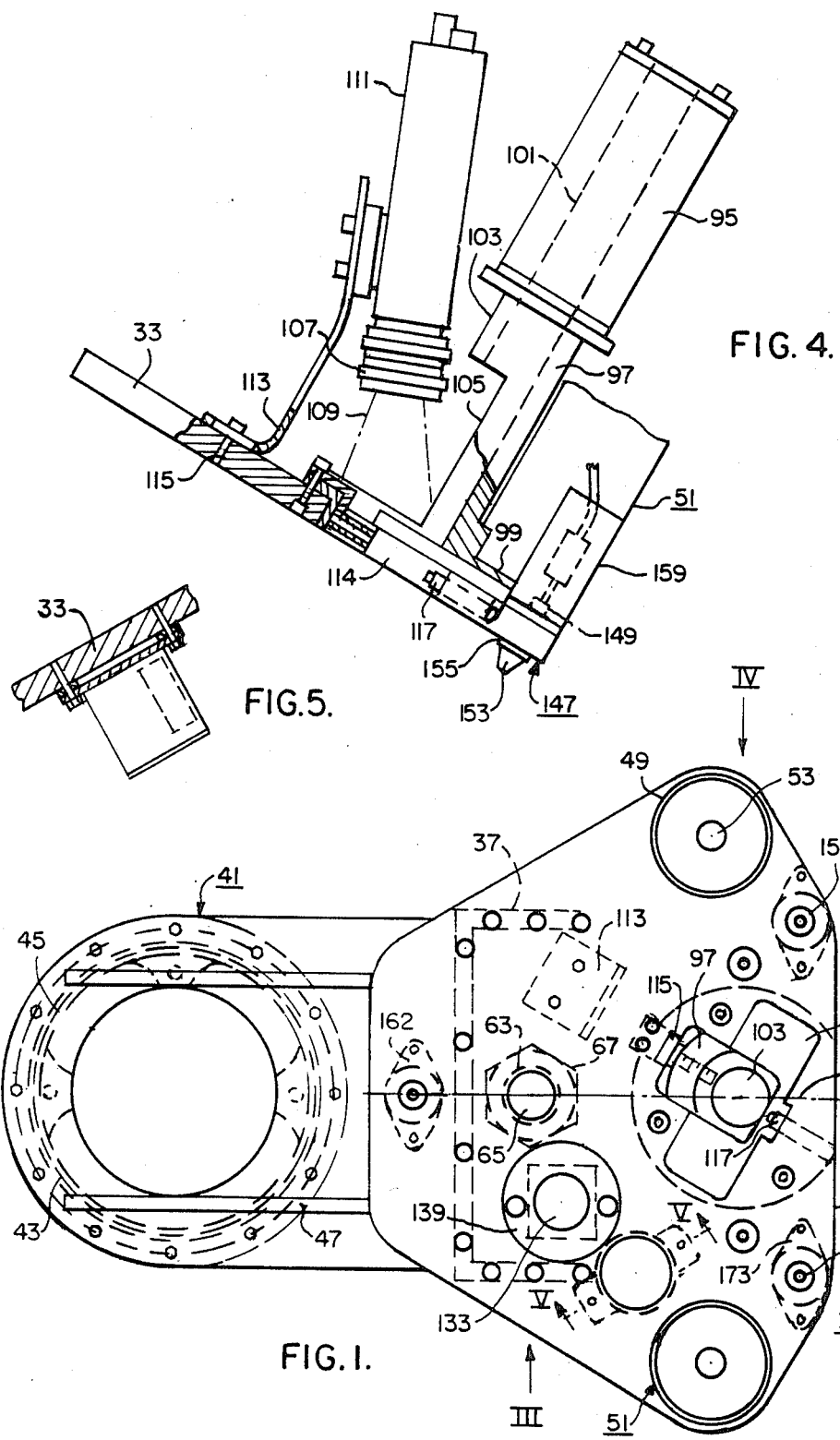
FIG. 1 is a plan view of the sleeving apparatus in accordance with this invention and which serves in the practice of the method of this invention as viewed from the direction I of FIG. 2, i.e., from the top.
Figure 2:
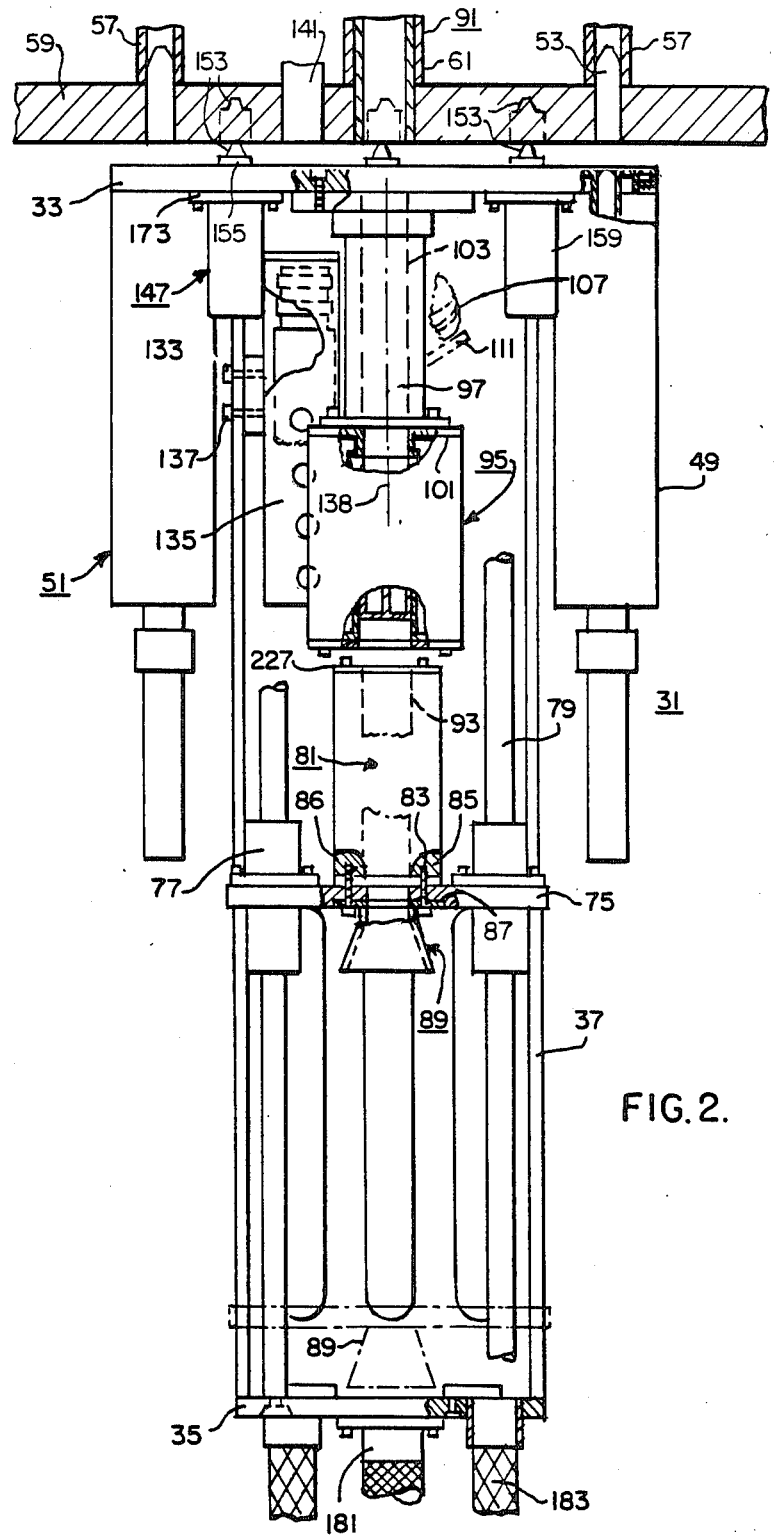
FIG. 2 is a view in side elevation taken in the direction II of FIG. 1.
Figures 3, 6:
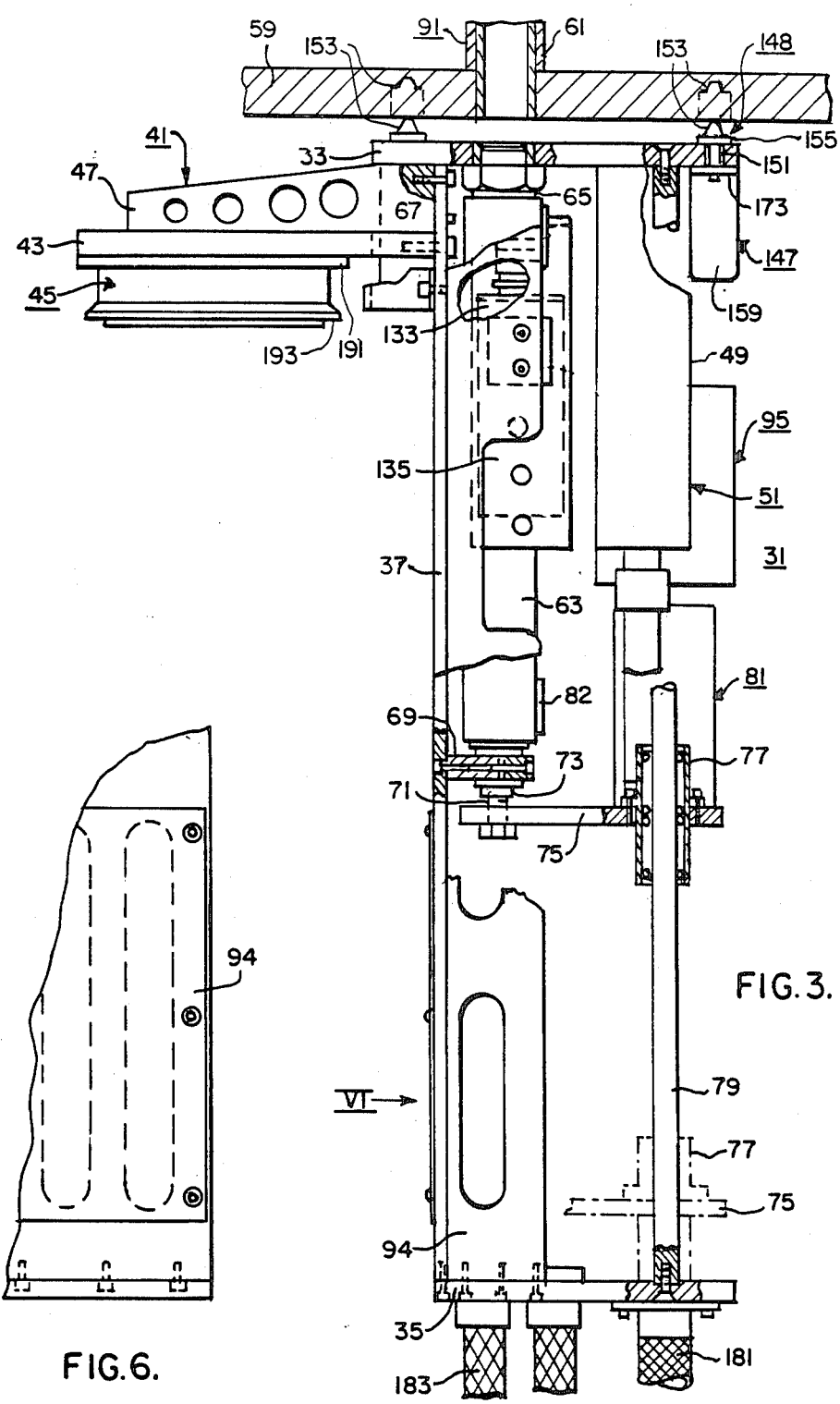
FIG. 3 is a view in end elevation taken in the direction III of FIG. 1.
FIG. 6 is a fragmental view in side elevation taken in the direction VI of FIG. 3.
Figure 7:
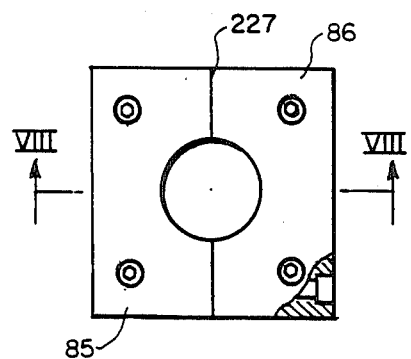
FIG. 7 is a plan view of the moveable gripper; the fixed gripper, being similar except for minor details, is not shown or described in detail.
Figure 23:
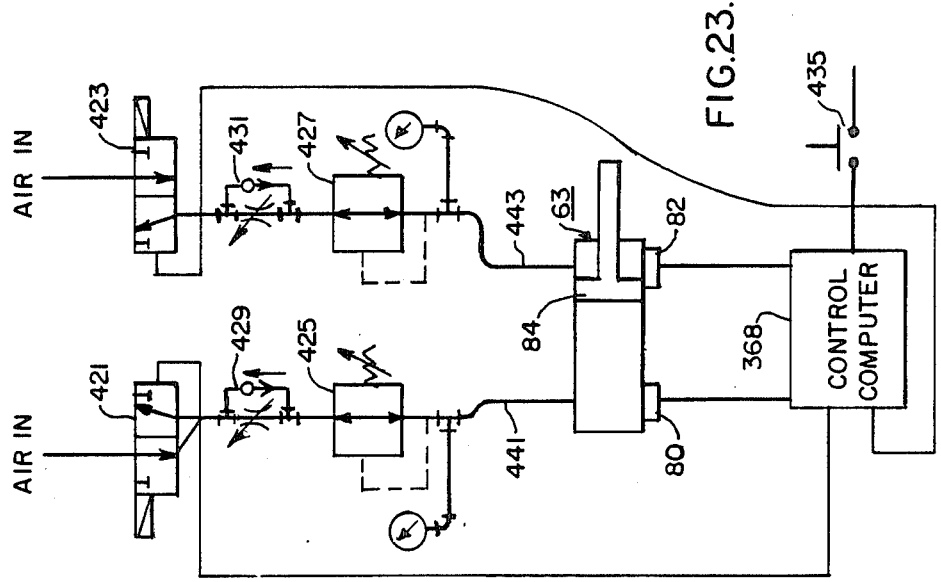
FIG. 23 is a fluid circuit diagram for the cylinder which drives the moveable gripper.

A cylinder 63 (FIGS. 1, 3) typically an air cylinder, is secured by a bolt 65 and nut 67 to the base plate 33 of the cylinder 63 and supported by a bracket 69 bolted to the back plate 37. A bolt 71 suspended from the piston rod 73 of the cylinder 63 carries a travel plate 75 (FIGS. 2, 3). Ball bushings 77 are mounted near the outer ends of the travel plate 75. The ball bushings 77 engage guide shafts or guide rods 79. As the piston rod 73 moves upwardly or downwardly, it carries the travel plate 75 with it. The travel plate is guided and supported by the rods 79. The cylinder 63 is provided with magnetic reed switches 80 and 82 at its upper and lower ends. The piston 84 (FIG. 23) carries paramagnetic elements which operate these switches when the piston moves into the lowermost or uppermost positions (FIGS. 3, 23).

Figure 19:
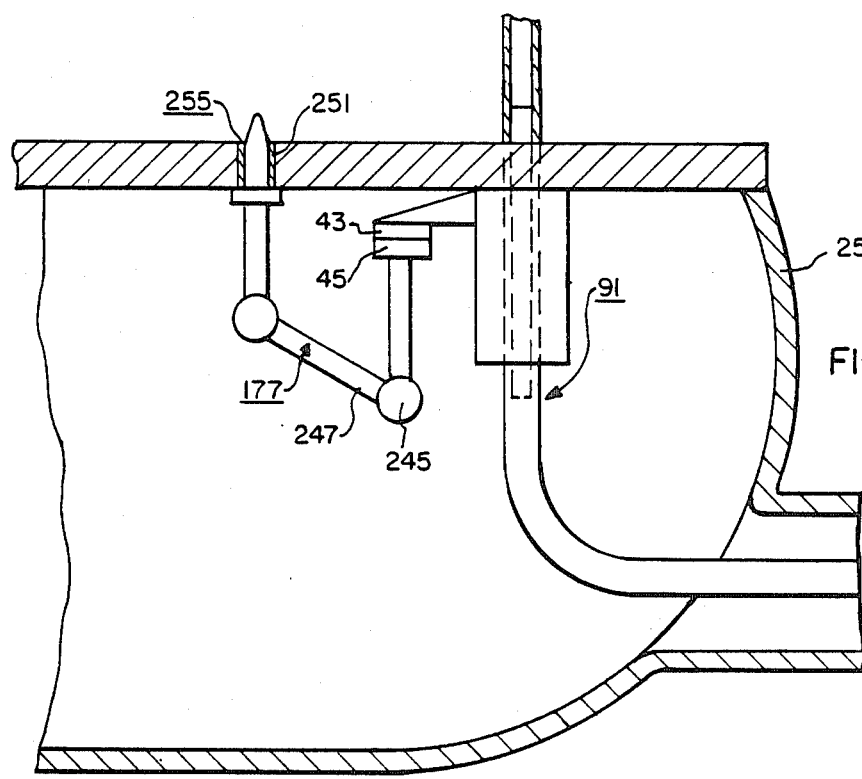
FIG. 19 is a diagrammatic view showing the manner in which the sleeving apparatus according to this invention is positioned in the channel head of a steam generator for an insertion opreation.

The moveable gripper or gripper assembly 81 is mounted centrally on the travel plate 75 and is carried with this plate as the plate is moved by the cylinder 63. The gripper 81 is secured by bolts 83 which are screwed into the bottom of the retainers 85 and 86 (FIGS. 7, 8, 8A, 8B) that form the sidewalls of the housing of the gripper 81. The bolts 83 pass through the flange 87 of a horn-shaped guide 89 securing the guide coaxially with the gripper 81. The guide 89 facilitates the entrance of the sleeving assembly 91 (FIG. 19) into the opening 93 (FIG. 8) of the gripper 81. The guide 89 is shown in FIG. 2 in the uppermost position in full lines and in the lowermost position in broken lines. The gripper 81 is omitted in the showing of the lowermost position . The lower part of the insertion apparatus is provided with a protective shield 94 (FIGS. 3, 6).

The fixed gripper or gripper assembly 95 is suspended from an adapter 97 (FIGS. 2, 4). The adapter 97 is connected to or may be integral with a plate 99 which is bolted to the base plate. The gripper 94 and the adapter 97 have coaxial openings 101 and 103 (FIGS. 2, 4) which are coaxial with opening 93 in the moveable gripper 81 so as to pass the sleeving assembly 91. The adapter 97 is circularly cylindrical but has a cutout 105 (FIG. 4) to accommodate the optical system 107 and the viewing angle 109 of the TV camera 111 of the closed-circuit TV unit 112 (FIG. 24) which monitors the insertion of the sleeving assembly 91 into the damaged tube 61. The TV unit 112 has a monitor 114 (FIG. 24) on which the insertion may be observed.The camera 111 is suspended from the base plate 33 at an appropriate angle to the base plate by a bracket 113 bolted to the base plate and to the camera. The base plate 33 has an opening 116 (FIG. 1) through which the insertion of the sleeving assembly 91 is viewed by the camera 111. The upward projection of the opening 103 (FIG. 1), through which the sleeving assembly 91 is passed during a sleeving operation, passes through the opening 116. A light sensor inlcuding a light source 115 and photoelectric cell and microswitch 117 are mounted on plate 33 on opposite sides of the upward projection of the opening 103. When the mandrel 119 (FIG. 17) is being retracted, the microswitch is actuated when the nose 121 of the mandrel has passed into the opening 103 indicating the status of the mandrel.

Figure 24:
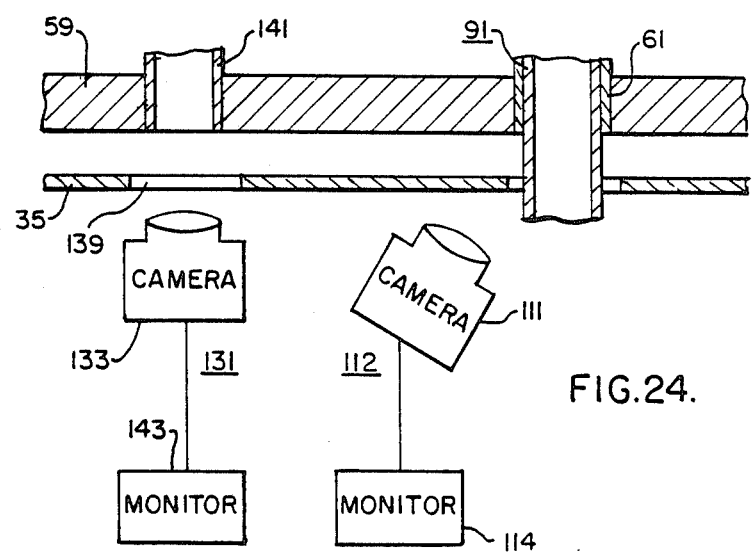
FIG. 24 is a block diagram showing the closed circuit TV units.

The sleeving apparatus 31 is provided with a second closed-circuit TV unit 131 (FIG. 24). The camera 133 (FIGS. 1, 2, 3) of the unit 131 is in a cover 135 which is suspended from a lug 137, bolted to the upper part of the U-shaped back plate 37. The camera 133 is positioned with its optic axis parallel (vertically in use) to the axis 138 through the openings 93, 101 and 103 through which the sleeving asesmbly 91 (FIG. 19) passes. Coaxial with the optic axis of the camera 133 there is a circular opening 139 (FIGS. 1, 24) in the base plate 33. The sleeving apparatus may be positioned by aligning the optic axis of the camera 133 with the axis of a tube 141 near the tube 61 being sleeved (FIG. 2). The unit 131 includes a monitor 143 (FIG. 24) connected to the camera 133.

To level the sleeving apparatus 31, or set it parallel to the surface of the tube sheet 59, a plurality of plunger assemblies 147 (FIGS. 1, 2, 3, 11, 12) are provided. Each assembly 147 includes a plunger 148. Each plunger 148 has a flanged stem 149 (FIGS. 11, 12) which passes slideably through a bushing 151 in the base plate 33. A tapered tip 153 extends from the flange 155 outwardly from the base plate coaxially with the stem 149. The stem 149 abuts an arm 157 which carries the slides of a linear potentiometer 158. The arm 157 and potentiometer are in a housing 159 suspended from the bottom of the base plate 33. The housing 159 has a cap 161 with a central opening through which the plunger 149 extends. The slider arm 157 of the potentiometer is encircled by a helical spring 163 which is compressed between the end of the plunger 148 and the top of the potentiometer 158. The end of the plunger 148 is engaged by a retaining ring 165. The ring 165 engages a lip over the opening in the housing 159 and prevents the plunger 148 from being thrust out of the opening in the housing by the spring 163. The potentiometer 158 is carried by a slide 167. The slide 167 is slideable in a slot between a base member 168 and a cooperative member 169, both of which extend from the cap 161. The initial position of the potentiometer 158 relative to its slides may be set by a screw 170 extending through the bottom of the container 159. The screw can be locked in any position by a nut 172. Each plunger assembly 147 has ears 173 by means of which it is bolted to the bottom of base plate 33.

The plunger assemblies are mounted with the axis of one passing through the center line 39 (FIG. 1) between the parallel sides of the base plate 33 and the axes of the other symmetrical with respect to this center line. When the sleeving apparatus is raised by the ROSA 177 (FIGS. 13, 14) to the position for sleeve insertion, the plunger tips 153 are engaged by the surface of the tube sheet, as shown in broken lines in FIGS. 2 and 3, and depressed. The resistance of the potentiometer, which can be measured with an ohmmeter, varies in accordance with the depression of the plungers 148. By comparing the resistances of the potentiometer 158, the level of the base plate 33 can be determined and adjusted. Typically, the potentiometer should be so calibrated that equal resistances for the potentiometer verifies that the base plate is level, i.e., parallel to the tube sheet 59.

A guide tube or conduit 181 (FIGS. 2, 3) is mounted on the lower surface of the bottom plate 35 coaxially with the moveable gripper 81, the fixed gripper 94 and the adapter 97. The conduit 181 serves for the transmission of the sleeving assembly 91. A plurality of cord grippers 183 also extend from the lower surface of the bottom plate 35. These cord grippers 183 engage the cables and conduits which are connected to the sleeving apparatus 31 while this apparatus is being positioned by the ROSA 177 and prevent the fouling or rupture of the conduits and cables.

Figure 13B:
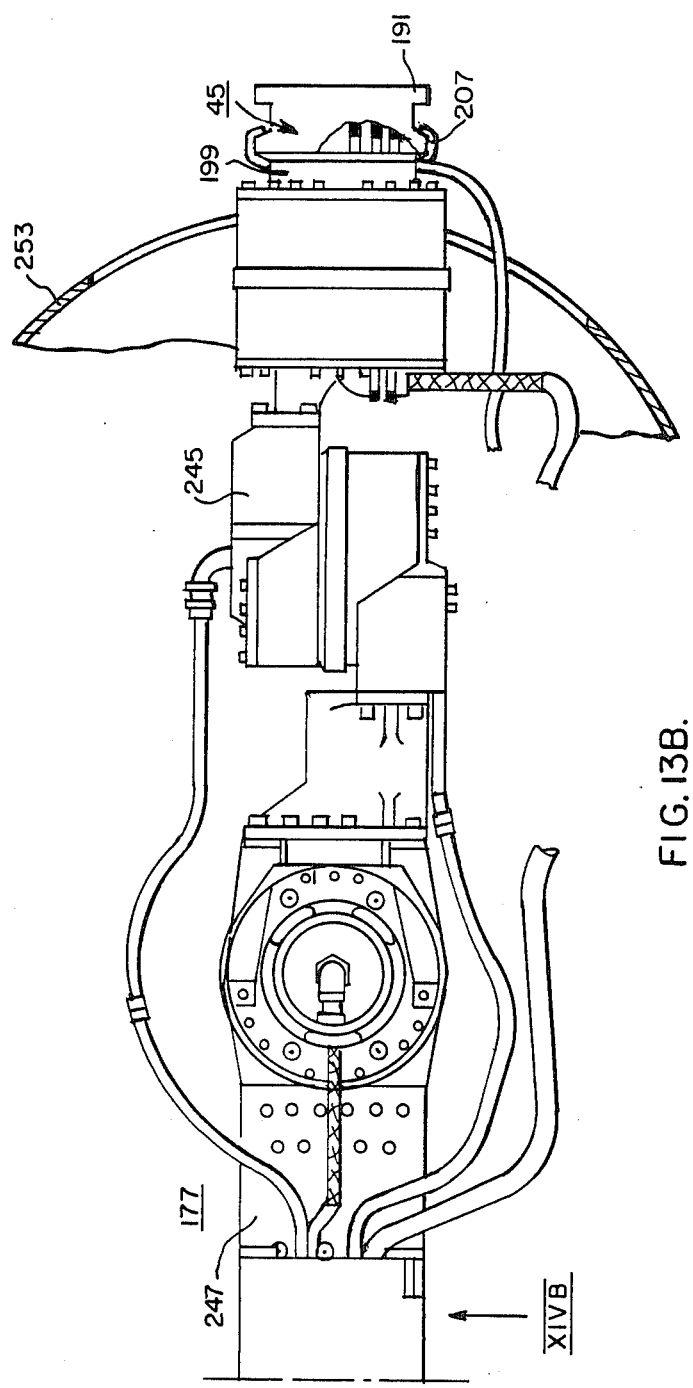
Figure 14A:
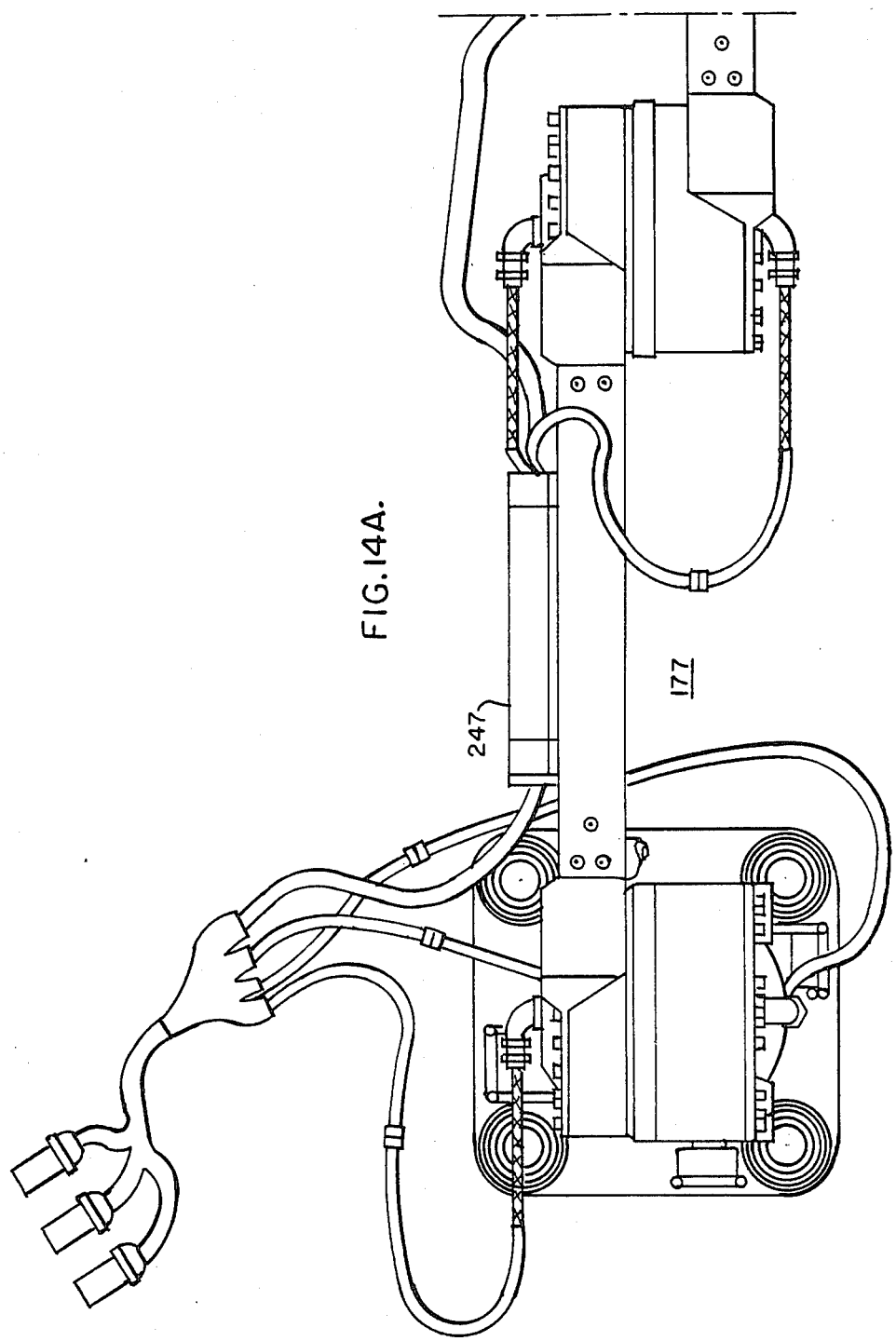
FIGS. 14A and 14B together constitute a view in side elevation taken in the direction XIVA—XIVB of FIGS. 13A and 13B.
Figure 14B:
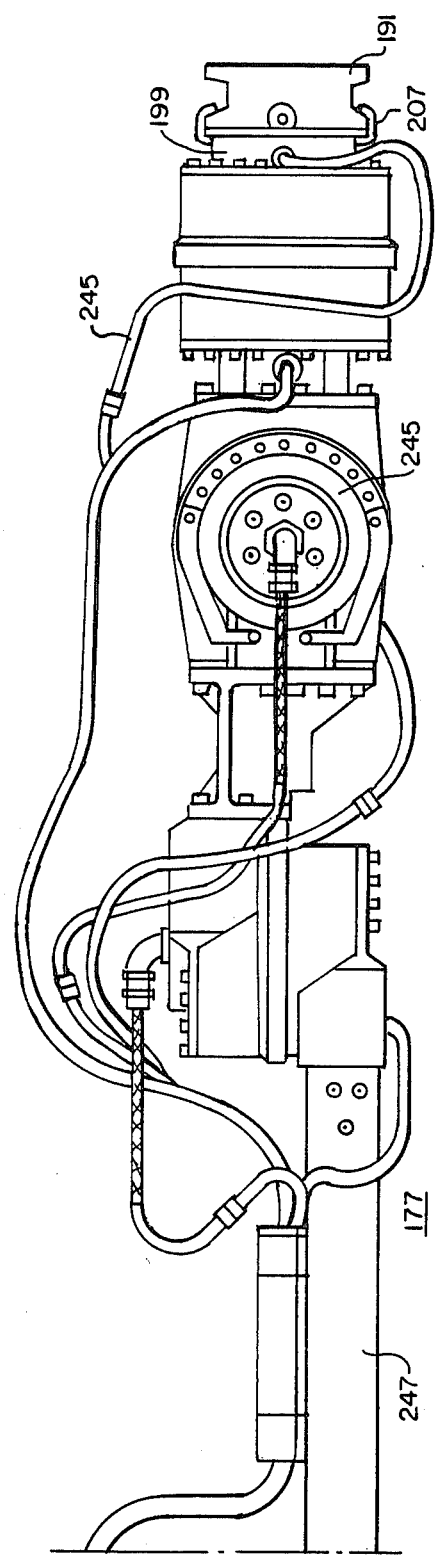
Figure 16:
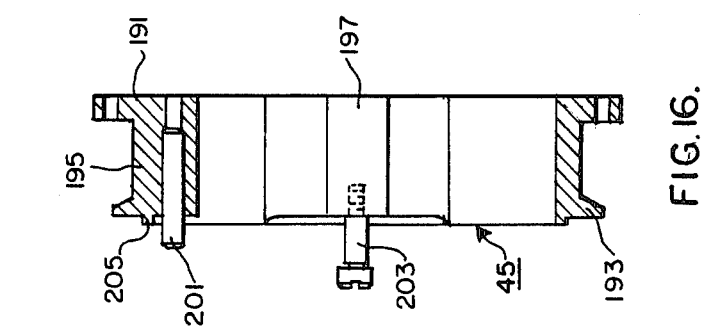
FIG. 16 is a view in transverse section taken along line XVI—XVI of FIG. 15.
Figure 15:
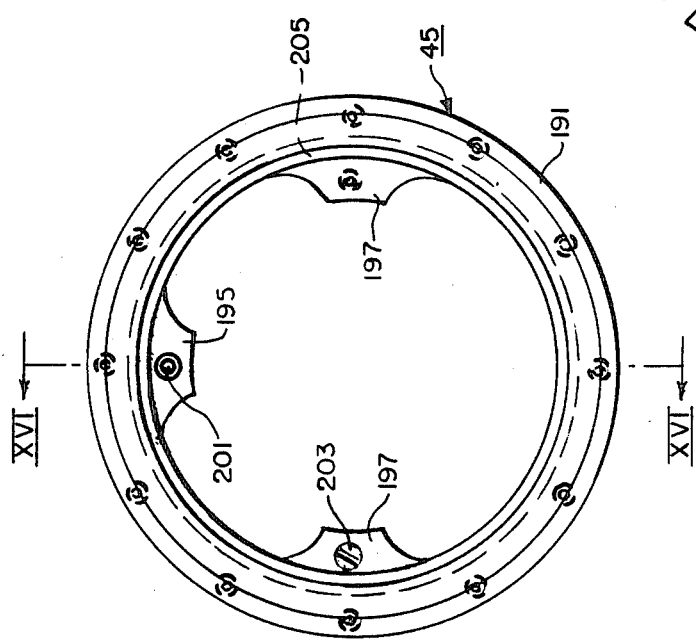
FIG. 15 is a view in end elevation of the connector on the sleeve-blank insertion apparatus for connecting to the ROSA.

The connector or coupler 45 (FIGS. 3, 15, 16) is a flanged annulus, typically composed of aluminum, having a flange 191 on one side and a flange-like projection 193 on the opposite side (FIGS. 15, 16). The coupler 45 is secured to plate 43 of the sleeving apparatus 31 by bolts which pass through the flange 191. The annulus has thickened sections 195 and 197. The connector 45 mates with a corresponding connector or coupler 199 at the end of the ROSA (FIG. 13B). The end surface of the coupler 199 is shaped to mate with the end surface of the coupler 45 having projections which penetrate in the regions between the projections 195 and 197. The projection 195 carries a pin 201 which penetrates into a hole in the coupler 199 for alignment purposes. The coupler 199 is secured to the coupler 45 by bolts 203 (FIG. 16) which are screwed into steel inserts in projections 197. The coupler 45 also has an axial projection 205 which penetrates into a groove in coupler 199. After the couplers 45 and 199 are joined, they are secured together by a band 207 (FIG. 13). The inner surface of the projection 193 is tapered to facilitate engagement of the band 207 with the projection.

Figure 8A:
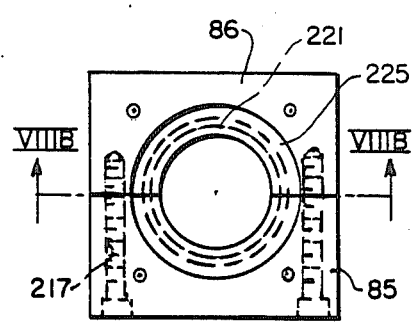
FIG. 8A is a plan view of the retainer for the gripping mechanism of the moveable gripper.
Figure 8:
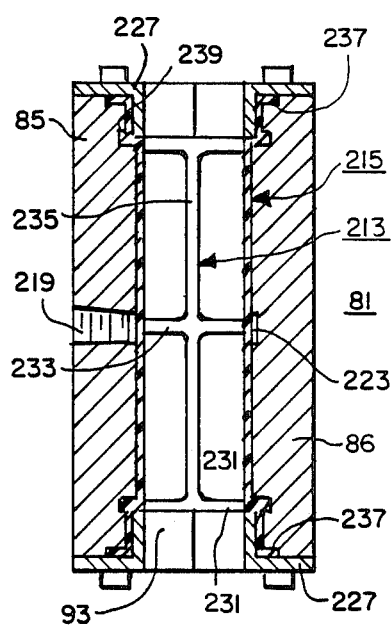
FIG. 8 is a view in longitudinal section taken along line VIII—VIII of FIG. 7.
Figure 8B:
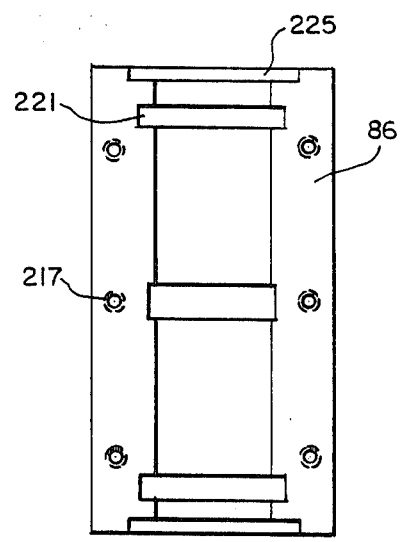
FIG. 8B is a view in longitudinal section taken along line VIIIB—VIIIB of FIG. 8A.
Figure 9:
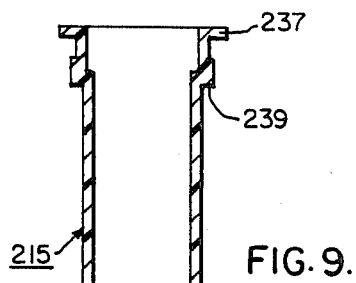
FIG. 9 is a view in longitudinal section of the gripping bladder of the moveable gripper.

The moveable gripper 81 and the fixed gripper 95 are basically alike and are disclosed in Arzenti-Pirl application Ser. No. 785,292. Only the moveable gripper 81 will be described here. This gripper, which may be more aptly referred to as, gripper assembly includes an enclosure formed by abutting the retainers 85 and 86, cage 213 and a bladder 215 (FIGS. 7-10). Typically, the retainers 85 and 86 are composed of aluminum. Each retainer is of generally U-transverse section with the external surface rectangular and the internal surface semicircular. The retainers 85 and 86 are bolted together by bolts which are countersunk in bolt holes 217 of retainer 86 and threaded into retainer 86 (FIG. 8A). Retainer 85 has a port 219 (FIG. 8) into which compressed air is injected. Bolted together, the retainers 85 and 86 form an assembly which is of square transverse cross-section on the outside and of circular transverse section on the inside. After the retainers 85 and 86 are bolted together to form the assembly, circular grooves 221 are machined near the upper and lower ends and a circular groove 223 is machined at the center (FIGS. 8, 8B). The groove 223 is in communication with the port 219. Shallow slots 225 are also machined in the top and bottom of the assembly. Annular caps 227 (FIG. 8) are secured to the top and bottom of the assembly 85-86 to form the housing. The caps 227 are of angular longitudinal cross-section with their sides which are parallel to the cylindrical retainer side walls defining inlet and outlet passages. The bolts 87 (FIG. 2) which secure the lower cap 227 to the assembly 85-86 also secures the horn-shaped member 89.

Figure 10:
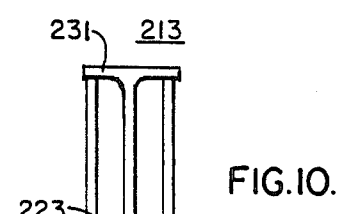
FIG. 10 is a view in side elevation of the cage over which the gripping bladder extends.
Figure 10A:
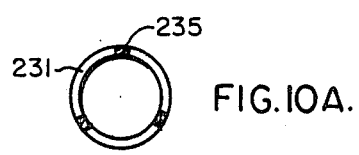
FIG. 10A is a view in transverse section taken along line XA—XA of FIG. 10.
Figure 11:
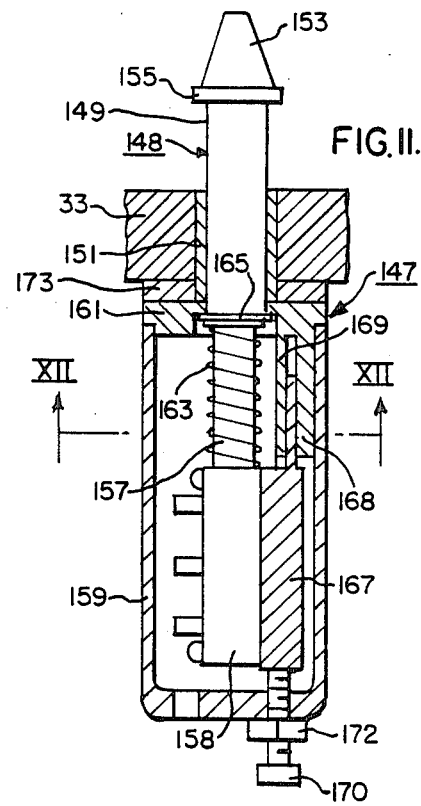
FIG. 11 is a view in longitudinal section of a plunger assembly which serves to position the sleeve-blank inserting apparatus.
Figure 12:
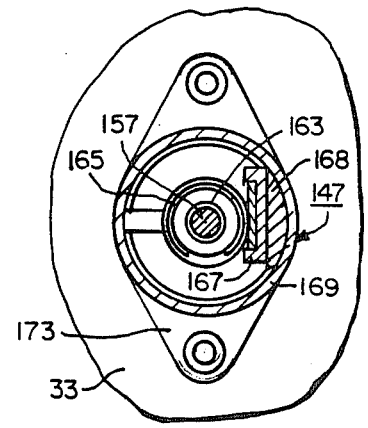
FIG. 12 is a view in transverse section taken along line XII—XII of FIG. 11.

The cage 213 (FIGS. 10, 10A) is composed of precipitation-hardened stainless steel. The cage has circular rings 231 at the ends and a ring 233 at the center. Longitudinal bars 235 are secured to the rings 231 and 233 spaced by 120° around the rings.

The bladder 215 (FIG. 9) which is the gripping or clamping member of the gripper assembly is composed of a pliable thermoelastometer, typically a pelethane compound. The bladder is of annular shape and has thermoelastomer end rings 237 and projections 239 near its upper and lower ends. The housing 85-86-227, cage 213 and bladder 215 are assembled into a unit as shown in FIG. 8. The rings 237 are clamped between the top and bottom caps 227 and in the slots 225 of the assembly 85-86. The projections 239 are engaged in the grooves 221 of the assembly. Internally, the bladder 215 extends over the cage 213. The groove 223 is between the bladder and the walls of the retainers 85 and 86. The volume between the bladder 215 and the nner walls of the retainers 85 and 86 must be pressure tight. To achieve this purpose, the projections 239 and the rings 237 are coated internally with a sealing compound before being inserted into the grooves 221. When a sleeving assembly 91 or mandrel 119 (FIG. 17) is to be gripped, the compressed air is injected through port 219 and flows through groove 223 and spreads over the bladder 215 collapsing the bladder onto the sleeving assembly or mandrel gripping the assembly or mandrel. Since the bladder is pliable, it conforms to the gripped surface.

The ROSA 177 (FIGS. 13A, 13B, 14A, 14B) includes in addition to the coupler 199, a plurality of actuators 245 interconnected by arms 247 which manipulate the arms into the desired positions. The coupler 199 is connected to an actuator 245 which facilitates its rotational movement. At the end remote from the coupler 199, the ROSA has a member having a plate 249 on which cam-lock assemblies 251 are mounted. In use, the ROSA 177 is positioned in the channel head 253 (FIG. 19) with its camlock 255 in engagement with tubes 57 (FIG. 19) in the tube sheet 59 which are located conveniently with respect to the tube or tubes 61 to be sleeved.

Figure 18:
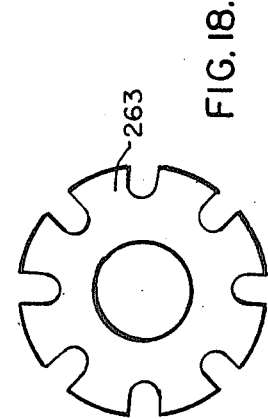
FIG. 18 is a plan view of the rosette of the mandrel used in the practice of this invention.
Figure 17:
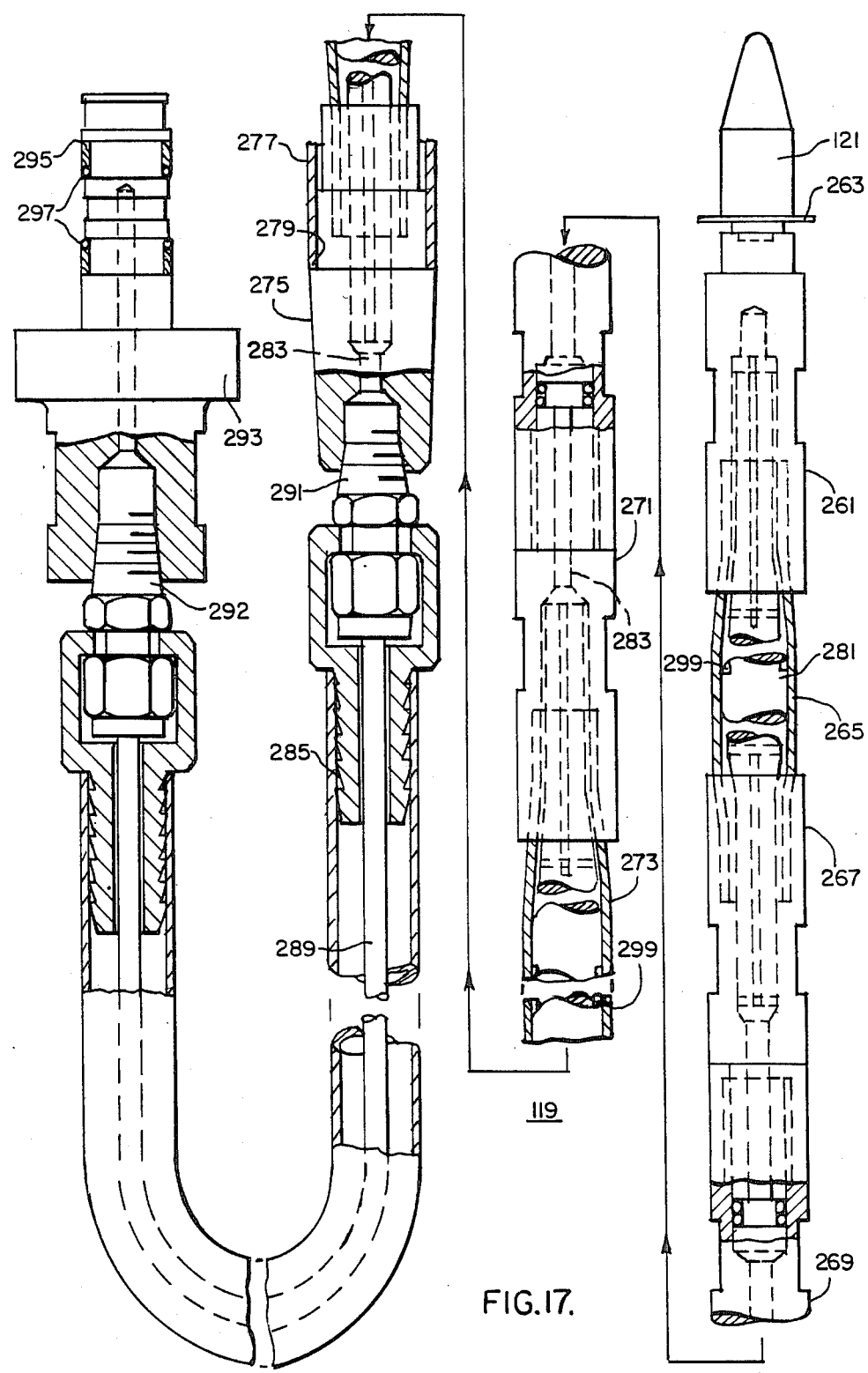
FIG. 17 is a view in side elevation, and partly in section, showing the mandrel on which the sleeve blank is mounted in the practice of this invention.

The mandrel 119 (FIG. 17) includes an end cap 261 to which the nose 121 is connected. A rosette 263 (FIG. 18) is secured to the inner end of the nose. A bladder 265 extends between the end cap 261 and a shank 267 and is sealed pressure tight to both. Additional shanks 269 and 271 extend from the shank 267 to endow the mandrel with the appropriate length. Another bladder 273 extends between the shank 271 and a sleeve blank positioner 275. Bladder 273 is sealed pressure tight in the shank 271 and in the sleeve-blank positioner 275. The sleeve-blank positioner is stepped. The sleeve blank 277 is mounted on the mandrel with the outer end engaging the outermost step 279 of the sleeve-blank positioner. In FIG. 17 the sleeve blank 277 is shown of enlarged diameter as conformed to the diameter shown in FIGS. 2 and 3. The body 281 of the mandrel is penetrated by a hole 283 which terminates within the end cap 261. A hose 285 extends from the outer end of the mandrel 119. A tube 289 extends through the hose and is connected pressure tight by a fitting 291 to the hole 283. At its outer end, the tube 289 is connected by a fitting 292 to connectors 293 and 295. Water or other liquid under pressure is supplied is sealed pressure tight to the connector 295 by O-rings 297. The body 281 has openings 299 at the longitudinal centers of the bladders 265 and 273. The shanks 267, 269 and 271 are so selected that when the sleeve blank 277 is fully inserted into the damaged tube 61 (FIG. 2), the bladder 273 is positioned in engagement with the part of the sleeve blank 277 in the tube sheet 59 and the bladder 265 is in engagement with the inner end of the sleeve blank. Water under pressure injected into the hole 283 passes through the openings 299 exerting pressure on the sleeve blank 277 at the two positions, through the bladders 265 and 273 and securing the sleeve blanks to the tube 61.

Each camlock assembly 51 (FIG. 20) includes the circularly cylindrical housing 49. The wall of the housing has a longitudinal slot 305 on one side. The top 307 of the housing 49 has a shoulder from which a neck or stem 309 extends. There is a circular hole in the top which is coaxial with the hole in the top plate 33 (FIGS. 1-3) from which the assembly 51 is suspended. There is a bushing 311 in the hole through the top 307. Lower bearing 313 is interposed between the shoulder and the base plate. A dowel pin 315 through the bearing 313 penetrates into the top 307. There is also an upper bearing 317 which is urged outwardly by springs 319. The springs facilitate adjustment of the position of each camlock assembly 51 permitting restricted lateral movement.

The housing end cap 323 at the lower end is dish-shaped, is supported on a retainer ring 325 just above the lower rim of the wall 349 and is secured by a screw 327. The end cap 323 has a circular hole which is coaxial with the hole in the top 307.

Within the housing 49 there is a composite piston and cylinder assembly including main pistons 331 and auxiliary piston 333 and cylinder 335. Cylinder 335 is mounted on main piston 331 and is moveable therewith. Auxiliary piston 333 is moveable relative to main piston 331. Cylinder 335 has a top 337 which has a circular hole coaxial with the hole through the top 307 of the housing 49. The rod 53 which carries the gripper collet 55 at the top has a flange 339 which is bolted to the top 337. The rod 53 is hollow. A rod 341 tapered at the tip 342 extends centrally from the auxiliary cylinder 333 passing through the top 337 and the rod 53.

The main piston 331 is prevented from becoming disengaged from the wall 343 of the cylinder 335 by a retaining ring 345. The main piston 331 engages the wall 343 in a shoulder 347. The wall 343 has a ring bearing 349 near its lower end. This bearing is interposed between the wall 343 and the wall of the housing 49 of the camlock assembly 51. O-rings 351, 353, 355 are interposed between the main piston 331 and the wall 343 of cylinder 335, the auxiliary piston 333 and the wall 343, and the rod 341 and the cap 337 of the cylinder 335.

The piston assembly 331-333 is driven by a cylinder 357. The piston rod 359 of cylinder 357 has a threaded tip 361 which is threaded centrally into the main piston 331 and secured by a nut 363. The upward (with respect to FIG. 20) thrust of the rod 359 advances the piston assembly 331-333. The piston 333 is moveable towards and away from piston 331. The piston 364 (FIG. 21) of cylinder 357 has a paramagnetic member (not shown). Externally, the cylinder 357 carries magnetic reed switches 365 and 367 which are actuable by a paramagnetic member at its extreme up and down positions. The switches 365 and 367 are connected to the control computer 368 (FIGS. 21, 22, 23) which controls the sleeving operation and sends intelligence to the computer of the position of the piston 364.

The cylinder 357 is supplied with compressed air to drive piston 364 upwardly. The compressed air is supplied through a connector 369 and a nipple 371 which are interconnected through an adapter 373. Air is supplied to drive piston 364 downwardly through elbow fitting 375. When piston 364 is driven upwardly, air is exhausted from elbow fitting 375 and when piston 364 is driven downwardly, air is exhausted from nipple 371, adapter 373 and connector 369.

Compressed air to drive piston 333 upwardly in cylinder 335 separately from piston 331 is supplied through elbow fitting 377 and to return piston 333 downwardly through elbow fitting 379. When piston 333 is driven upwardly, air is exhausted from fitting 379 and when piston 333 is driven downwardly, air is exhausted from fitting 377. The fittings are inserted in housing 49 through slot 305 and are moveable upwardly and downwardly in this slot.

The operation of the camlock assemblies 51 will be described with reference to FIG. 21. For controlling the direction and magnitude of the airflow into the cylinders 335 and 357, there are associated with each camlock assembly solenoid-actuated flow switches 381 and 383 and pilot pressure-actuated valve 385. Switch 381 controls the flow to cylinder 357, which drives the piston assembly 331-333, through an adjustable regulator 387. The regulator 387 maintains the pressure in cylinder 357 at a low magnitude, typically between 15 and 20 psi, so that the piston 364 and the piston assembly 331-335 is advanced slowly and advances rod 53 and collet 55 slowly into tube 57. Switches 383 and 385 control the flow from a high-pressure source, typically 200 psi, to cylinder 335 which drives rod 341 to set the collet 55 (FIG. 20) in the locked or the unlocked setting.

Figure 21:
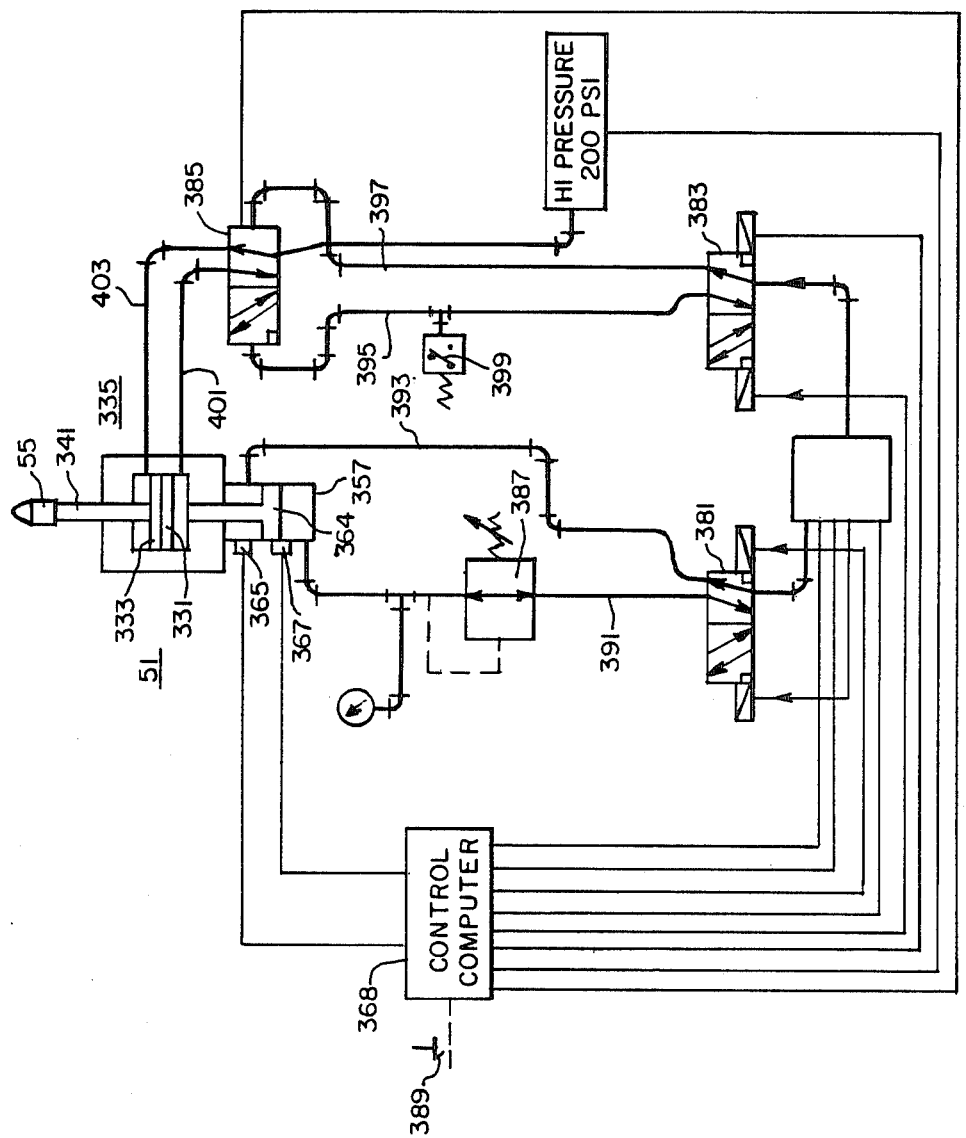
FIG. 21 is a fluid circuit diagram for the operation of the camlock assembly shown in FIG. 20.

In standby, the apparatus is set as shown in FIG. 21 with the pistons 357, 331 and 333 of each camlock assembly retracted, and switches 381 and 383, and pressure actuated valve 385 set to supply air above the pistons. The sleeving apparatus 31 (FIGS. 1, 2, 3) is positioned for a sleeving operation into a damaged tube 61 and a start push button 389 is closed. Solenoid switch 381 is set in the left-hand setting and air flows into cylinder 357 below piston 364 through the switch 381, through conductor 391, and regulator 387. Air is exhausted from cylinder 357 above piston 364 through conductor 393. At this point switch 383 and pressure-actuated valve 385 are in their standby settings. Piston 364 is raised and it raises piston assembly 331-333. Collet 55 is advanced into tube 57. Piston 364 rises until it actuates reed switch 365. Switch 383 is set in the left-hand setting. Air flows into valve 385 through conductor 395 and out through conductor 397. When the pressure reaches an appropriate magnitude, pressure switch 399 is actuated, switch 385 is set in the left-hand setting and high pressure is supplied to piston 333, the air flowing in through conductors 395 and 401 and exhausting through conductors 403 and 397. The collet 55 is operated to lock the camlock to tube 57. Each camlock assembly 51 remains in the operated setting with the camlocks locked to their associated tubes 57. To unlock the camlocks, the above-described procedure is reversed.

Figure 22:
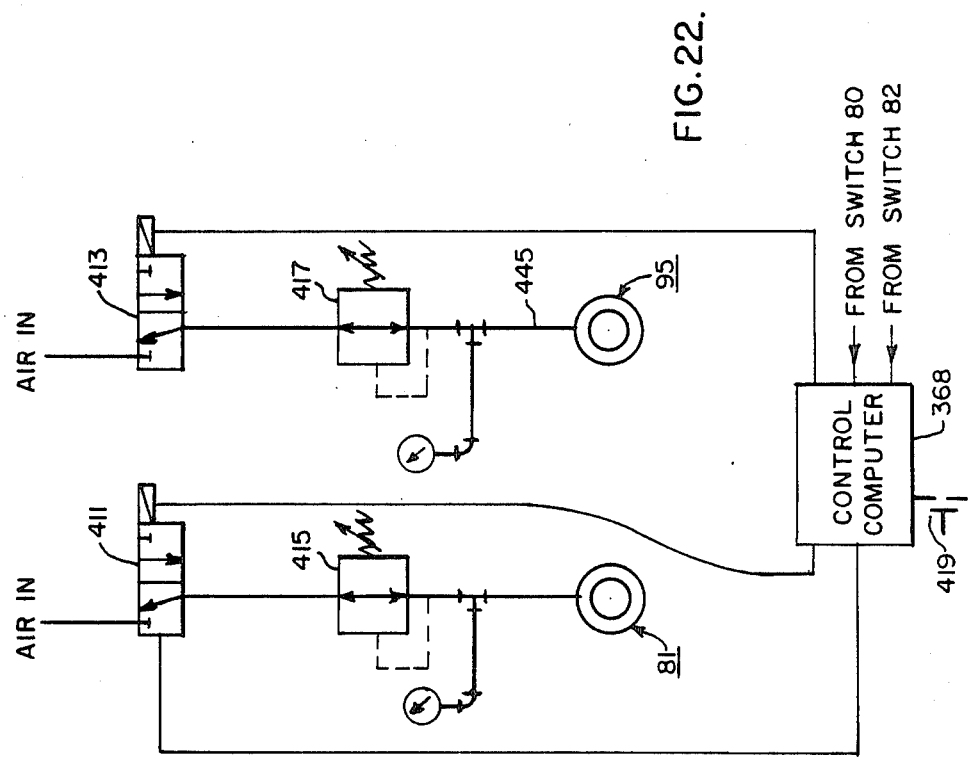
FIG. 22 is a fluid circuit diagram for the fixed and moveable gripper; these diagrams being shown together because the grippers are coordinated.

The operation of the moveable and fixed grippings or gripper assemblies 81 and 95 will now be described with reference to FIGS. 22 and 23. The airflow to each gripper 81 and 95 is controlled by a solenoid air switch 411 and 413. The airflow in each case is regulated by regulators 415 and 417. In FIG. 22 the apparatus is shown in standby with solenoids 411 and 413 set to the left. With reference to FIG. 23, the flow through cylinder 63 is controlled by solenoid switches 421 and 423. The air flows through adjustable regulators 425 and 427 and flow restrictors or check valves 429 and 431. The regulator 425 which controls the flow to advance the piston 84 is typically set at between 50 and 55 psi; the regulator 427 which controls the flow to retract the piston 84 is set typically at between 60 and 65 psi. The reason the retracted pressure is higher than the insertion pressure is to provide additional force for removing the sleeving assembly if it encounters an obstruction in the tube.

In standby, switches 421 and 423 are set to the left. The piston 84 is set in the lowermost position with reference to FIG. 3 (to the right with reference to FIG. 23) and moveable gripper 81 is in the lowermost position. Switches 411 and 413 are set to the left as shown.

It is assumed that the sleeving apparatus 31 has been secured to ROSA 177 (FIGS. 11, 12) and has been drawn into the channel head 253. The TV units 112 and 131 are on and the light 115 is on. The sleeving assembly 91 (FIG. 19) is inserted. The apparatus or tool 31 is centered with the aid of the closed circuit TV units, particularly unit 131 (FIG. 24). The camlock assemblies 51 are inserted and locked. The sleeving assembly 91 (FIG. 19) extends into the moveable gripper 81 in the lowermost position.

The start push buttom 419 is actuated. The computer 368 causes switch 411 to be set to the right. The moveable gripper 81 grips sleeve blank assembly 91. With reference to FIG. 23, switches 421 and 423 are set to the right by command of the computer 368. Air flows in through switch 423 and conductor 443 and out through conductor 441 and switch 421 to advance the piston 84, gripper 81 and sleeving assembly 91. When piston 84 reaches the uppermost position with reference to FIG. 3 (to the left with reference to FIG. 23), reed switch 80 is actuated and the computer 368 commands switch 413 to move to the right. Air flows through switch 413 and conductor 445 causing the fixed gripper 95 to engage the sleeving assembly 91. Shortly thereafter, the computer commands switch 411 to move to the left. The air is exhausted from moveable gripper 81 and this gripper disengages the sleeving assembly. Then the computer 368 commands switches 423 and 421 to move to the left. The piston 84 is returned to the lowermost position (left FIG. 3) carrying the moveable gripper 81 with it. The above steps are then repeated until the sleeve blank is fully inserted into tube 61. Pressure is then applied through nose 289 (FIG. 19) and bladder 265 and to 273 and the sleeving proceeds.

While a preferred embodiment of this invention has been disclosed herein, many modifications thereof are feasible. For example, while this invention is uniquely suitable for the sleeving of tubes of steam generators of nuclear reactors and is intimately interrelated with this purpose, the invention may be applied more generally to the sleeving of tubes in apparatus of other types such as sleeves of tubes in support plates. The invention may also serve to insert other devices into steam generator tubes, such as eddy current and ultrasonic inspection probes which rely on flexible-member insertion techniques. It may also serve in the honing of tubes. Such general use is within the scope of equivalents of this invention. While the air cylinder 63 (FIGS. 1, 2, 3) is uniquely suitable for the practice of this invention inasmuch as the use of commercial voltage (110 V) motors is undesirable, there may be situations in which a motor can be used to drive the moveable gripper 81. This invention is not to be restricted except insofar as is necessitated by the spirit of the prior art.

We claim:

1. Apparatus for inserting a sleeve blank into a damaged tube of a steam generator by vertically upward thrust from a position vertically below the damaged tube, said sleeve blank being mounted on a mandrel longer than said sleeve blank, said sleeve blank and mandrel being referred to herein as "sleeving assembly", said apparatus including: means, connected to said apparatus, for positioning said apparatus below said tube for insertion of said sleeve blank into said tube, a first gripper, means, connected to said first gripper, for actuating said first gripper to engage said sleeving assembly and to disengage said sleeving assembly, means, connected to said first gripper, for advancing said first gripper, while said apparatus is positioned for insertion, between a first position vertically below and more remote from said tube and a second position vertically nearer said tube, a second gripper, second means, connected to said second gripper, for actuating said second gripper to engage said sleeving assembly and to disengage said sleeving assembly, first means, responsive to said first gripper, when said first gripper is in said first position, for setting said second actuating means to actuate said second gripper to disengage said sleeving assembly and to set said first actuating means to actuate said first gripper to engage said sleeving assembly and thereafter to actuate said advancing means to advance said first gripper and said sleeving assembly generally vertically from said first position to said second position, and second means, responsive to said first gripper when said first gripper is in said second position, for setting said second actuating means to actuate said second gripper to engage said sleeving assembly and to set said first actuating means to actuate said first gripper to disengage said sleeving assembly and thereafter to actuate said advancing means to retract said first gripper generally vertically to said first position.

2. The apparatus of claim 1 wherein the second setting means includes a switch actuable by the first gripper when it is in the second position.

3. The apparatus of claim 1 wherein the first setting means includes a switch actuable by the first gripper in the first position.

4. The apparatus of claim 1 in whose use the mandrel is removed from the sleeving assembly after the sleeve blank is fully inserted in the tube as a sleeve, the said apparatus including photoelectric means signalling the complete removal of the mandrel from the sleeving assembly.

5. The apparatus of claim 1 including means, cooperative with the positioning means, for indicating that the said apparatus is properly positioned for the insertion.

6. The method of inserting a sleeve blank into a damaged tube in the tube sheet of a steam generator with apparatus including a fixed gripper and a movable gripper, and means to be actuated for moving said movable gripper between a first position and a second position; said method comprising; inserting a mandrel longer than said sleeve blank in said sleeve blank to form a sleeving assembly, mounting said sleeving assembly in said apparatus in position to be engaged by said fixed and movable grippers, suspending said apparatus from said tube sheet positioned under said tube sheet, with the first position of said movable gripper generally vertically remote from said tube and its second position generally vertically nearer said tube, so that said sleeving assembly, mounted as aforesaid, is in position to be inserted generally upwardly vertically in said tube and repeating the following cycle in sequence until said sleeve blank is fully inserted in said tube as a sleeve;

(a) actuating said moving means to set said movable gripper in said first position;
(b) while said movable gripper is in said first position engaging said sleeving assembly with said movable gripper,
(c) disengaging said fixed gripper from said sleeving assembly,
(d) while said movable gripper is engaged with said sleeving assembly actuating said moving means to advance said movable gripper generally vertically upwardly from said first postion to said second position; thereby to advance said sleeve blank generally vertically into said tube a predetermined distance, (e) thereafter engaging said sleeving assembly with said fixed gripper, and (f) while said fixed gripper engages said sleeving assembly, disengaging said movable gripper from said sleeving assembly;

and after said sleeve blank is fully inserted in said tube to form a sleeve, removing said mandrel from said sleeve.

7. A method for incrementally advancing an elongated object generally vertically upwardly and withdrawing an advanced elongated object generally vertically downwardly through a dimensionally confined opening to which access is limited by a surrounding structure; said method being practiced by means of first and second gripper means, wherein said second gripper means is reciprocably movable by moving means relative to said first gripper means and also being practiced by means for aligning said elongated object with said opening; the said method comprising the steps of:

(a) suspending said first and second gripper means and said moving means from said surrounding structure below said surrounding structure, (b) aligning said elongated object with said opening by means of said aligning means and after said elongated object has been aligned, repeatedly, until said elongated object is fully inserted in said opening, (c) ungripping said object from said first gripper means while gripping said object with said second gripper means, (d) moving said second gripper means relative to said first gripper means vertically upwardly to move said object through said opening, (e) gripping said object after it has been so moved with said first gripper means while ungripping said object from said second gripper means, and (f) after said object has been ungripped from said second gripper means, moving said second gripper means relative both to said first gripper means and relative to said object preparatory for a succeeding incremental advancing of said object.

8. Apparatus for inserting a sleeve blank into a damaged tube of a steam generator, said steam generator including a tube sheet into which said damaged tube extends; the said apparatus including means, connected to said apparatus, for positioning said apparatus for insertion of said sleeve blank into said tube, means, cooperative with said positioning means, for indicating that said apparatus is properly positioned for said insertion; said indicating means including a plurality of plungers extending from said apparatus so as to be engaged and depressed by said tube sheet when said apparatus is positioned for insertion of a sleeve blank, the said indicating means also including means, responsive to the depressions of said plunger, for indicating the proper positioning of said apparatus;

the said apparatus also including a first gripper, first means, connected to said first gripper, for actuating said first gripper to engage or disengage said sleeve blank; means, connected to said first gripper, for advancing said first gripper, while said apparatus is positioned for insertion, between a first position more remote from said damaged tube and a second position nearer said tube, a second gripper, second means, connected to said second gripper, for actuating said second gripper to engage or disengage said sleeve blank; first means, responsive to said first gripper, when said first gripper is in said first position, for setting said second actuating means to actuate said second gripper to disengage said sleeve blank and to set said first actuating means to actuate said first gripper to engage said sleeve blank and thereafter to actuate said advancing means to advance said first gripper and said sleeve blank from said first position to said second position; and second means, responsive to said first gripper when said first gripper is in said second position, for setting said second actuating means to actuate said second gripper to engage said sleeve blank and to set said first actuating means to actuate said first gripper to disengage said sleeve blank and thereafter to actuate said advancing means to retract said first gripper to said first position.

9. An apparatus for incrementally advancing an elongated object generally upwardly and withdrawing an advanced elongated object generally vertically downwardly through the open end of a peripherally located heat-exchange tube in the tube sheet of a steam generator comprising:

(a) a frame having an upper plate means, and a reciprocably movable platform means beneath said upper plate means, (b) first and second gripper means for selectively gripping and ungripping said object, said first gripper means being mounted on said upper plate means and said second gripper means being mounted on said platform means, (c) means for reciprocating said platform means with respect to said frame, so that said second gripper means reciprocates relative to said first gripper means, and (d) a control system connected to said reciprocating means for coordinating the gripping condition of said first and second gripper means with the reciprocating means responsive to the operation of said reciprocating means so that said elongated object is moved in a desired direction through said open end of said tube;

said frame, said first and second gripper means, said platform and said reciprocating means constituting a structural unit, the said apparatus also including means for suspending said structural unit from said tube sheet in position for advancing and withdrawing said elongated object, said structural unit and said suspending means being of relatively low weight so as to lend themselves for manipulation by a remote operated service arm.

10. Apparatus for inserting a sleeve blank into a damaged tube of a steam generator, said steam generator including a tube sheet into which said damaged tube extends, the said sleeve blank being mounted on a mandrel, the said sleeve blank and mandrel being referred to herein as "sleeving assembly", the said apparatus including means, connected to said apparatus, for positioning said apparatus for insertion of said sleeving assembly into said tube, means, cooperative with said positioning means, for indicating that said apparatus is properly positioned for said insertion; said indicating means including a plurality of plungers extending from said apparatus so as to be engaged and depressed by said tube sheet when said apparatus is positioned for insertion of a sleeve blank, the said indicating means also indicating a potentiometer means connected to each said plunger so that the output potential of each said potentiometer means is varied in dependence upon the magnitude of the depression of the associated plunger, the proper positioning of said apparatus being identified by a predetermined relationship between the potential output of said potentiometer means connected to said plungers;

the said apparatus also including a first gripper, first means, connected to said first gripper, for actuating said first gripper to engage or disengage said sleeving assembly, means, connected to said first gripper, for advancing said first gripper, while said apparatus is positioned for insertion, between a first position more remote from said tube and a second position nearer said tube, a second gripper, second means, connected to said second gripper, for actuating said second gripper to engage or disengge said sleeving assembly, first means, responsive to said first gripper, when said first gripper is in said first position, for setting said second actuating means to actuate said second gripper to disengage said sleeving assembly and to set said first actuating means to actuate said first gripper to engage said sleeving assembly and thereafter to actuate said advancing means to advance said first gripper and said sleeving assembly from said first position to said second position, and second means, responsive to said first gripper when said first gripper is in said second position, for setting said second actuating means to actuate said second gripper to engage said sleeving assembly and to set said first actuating means to actuate said first gripper to disengage said sleeving assembly and thereafter to actuate said advancing means to retract said first gripper to said first position.

11. Apparatus for inserting a sleeve blank into a damaged tube of a steam generator, said steam generator including a tube sheet into which said damaged tube extends, said apparatus including; means, connected to said apparatus, for suspending said apparatus from said tube sheet vertically below said tube sheet positioned and aligned with said tube for insertion by upward thrust of said sleeve blank into said damaged tube, a first gripper, first means, connected to said first gripper, for actuating said first gripper to engage or to disengage said sleeve blank means, connected to said first gripper, for advancing said first gripper, while said apparatus is so positioned, generally vertically upwardly between a first position more remote from said tube and a second position nearer said tube, for insertion of said sleeve blank into said damaged tube, a second gripper, second means, connected to said second gripper, for actuating said second gripper to engage said sleeve blank or to disengage said sleeve blank, first means, responsive to said first gripper, when said first gripper is in said first position, for automatically setting said second actuating means to actuate said second gripper to disengage said sleeve blank and to set said first actuating means to actuate said first gripper to engage said sleeve blank and thereafter to actuate said advancing means to advance said first gripper and said sleeve blank generally vertically from said first position to said second position, and second means, responsive to said first gripper, when said first gripper is in said second position, for setting said second actuating means to actuate said second gripper to engage said sleeve blank and to set sid first actuating means to actuate said first gripper to disengage said sleeve blank and thereafter to actuate said advancing means to retract said first gripper to said first position, said first and second grippers, said actuating means, and said suspending means being of so low weight and the weight of said advancing means being correspondingly so low that the said apparatus lends itself to manipulation by a remote operated service arm.

* * * * *